United States Patent [19]

Garrison

[11] Patent Number: 4,587,166
[45] Date of Patent: May 6, 1986

[54] PLATED MAGNETIC RECORDING MATERIAL AND PROCESS FOR MAKING SAME

[75] Inventor: Marvin C. Garrison, San Carlos, Calif.

[73] Assignee: Ampex Corporation, Redwood City, Calif.

[21] Appl. No.: 466,805

[22] Filed: Feb. 16, 1983

[51] Int. Cl.⁴ .............................................. G11B 5/66
[52] U.S. Cl. ................................ 428/336; 360/134; 427/127; 427/128; 427/130; 427/131; 427/132; 427/404; 427/409; 156/233; 156/247; 428/694; 428/900
[58] Field of Search ............... 427/132, 131, 128, 127, 427/130, 404, 409; 428/693, 694, 336, 900; 156/233, 241, 247; 360/134–136

[56] References Cited

U.S. PATENT DOCUMENTS

| | | | |
|---|---|---|---|
| 2,996,418 | 8/1961 | Bleil | 156/233 |
| 3,457,634 | 7/1969 | Root | 427/132 |
| 3,671,351 | 6/1972 | Ties | 156/233 |
| 4,017,265 | 4/1977 | Taylor | 428/928 |
| 4,128,691 | 12/1978 | Shirahata | 427/132 |
| 4,215,170 | 7/1980 | Vilaprinyo Oliva | 428/457 |

FOREIGN PATENT DOCUMENTS

| | | | |
|---|---|---|---|
| 0104022 | 8/1981 | Japan | 156/233 |
| 1583544 | 1/1981 | United Kingdom | 156/233 |

*Primary Examiner*—Ellis P. Robinson
*Attorney, Agent, or Firm*—Thomas E. Ciotti; Elizabeth E. Strnad; Ralph L. Mossino

[57] ABSTRACT

Plated magnetic recording material, such as magnetic tape, composed of a thin layer of ferromagnetic metal and a base film layer are made by plating a passivated smooth continuous surface such as the surface of a cylindrical mandrel or an endless belt with a plate of ferromagnetic metal, applying the base film layer to the plated surface, and stripping the resulting laminated composite from the surface. The smoothness of the surface of the ferromagnetic metal layer depends on the smoothness of the continuous surface rather than on the smoothness of the surface of the base film stock.

13 Claims, 2 Drawing Figures

PLATED MAGNETIC RECORDING MATERIAL AND PROCESS FOR MAKING SAME

DESCRIPTION

1. Technical Field This invention is in the field of magnetic recording media. More particularly, it concerns a novel plated magnetic recording media comprising a laminated composite of a thin layer of ferromagnetic metal and a layer of a flexible nonmagnetic support or backing.

1. BACKGROUND ART

Plated magnetic recording media, e.g., plated magnetic tape, are known in the art. These media are referred to as "binderless" or "metallic thin film" media because the magnetic layer is composed of a continuous metal film rather than a matrix of magentic particles in a resin binder. Metallic thin film recording media are especially useful where high density magnetic recording is required.

Metallic thin film recording media are conventionally made by depositing a ferromagnetic metal layer on a nonmagnetic base support or film by vapor deposition or sputtering, or by plating the ferromagnetic metal layer onto the base film from an electroplating or electroless plating bath. A primary problem with metallic thin film media prepared by these prior processes is the coarse surface contour of the metal film because of its assuming the surface contour of the base film which is typically a polymer web having a nonuniform surface roughness. This roughness is often of a degree that causes improper recording head contact. In this regard U.S. Pat. No. 4,097,650 describes a process for making metallic thin film magnetic tape by conventional methods using a support layer that has a low surface roughness. The resulting magnetic tape is said to have improved surface smoothness providing excellent signal output and noise modulation. This patent describes the advantages attendant reduced surface roughness. It does not, however, address the practical problem of how one obtains base films of low, uniform surface roughness.

A main object of the present invention is to provide a plated magnetic recording medium having a ferromagnetic metal layer whose surface contour is independent of the surface contour of the base film.

A correlary object of the present invention is to provide a process for making plated magnetic recording media that have a uniform, smooth metal surface and whose preparation does not require starting with a base film of uniform, low surface roughness. The process of the present invention is also adaptable to making magnetic recording media that include layers in addition to the metal layer and the base layer.

DISCLOSURE OF THE INVENTION

The plated magnetic recording medium of the invention comprises a laminated composite of:

(a) a nonmagnetic base film layer; and
(b) a thin plate of a ferromagnetic metal adjacent one side of the base film layer, the surface contour of the plate being substantially independent of the surface contour of the side of the base film layer to which the plate is adjacent.

The process for making such a plated magnetic recording medium comprises the steps of:

(a) plating a passivated smooth continuous surface with a thin plate of ferromagnetic metal;
(b) applying a nonmagnetic base film to the plated continuous surface to form a laminated composite; and
(c) stripping the laminated composite from the continuous surface.

BRIEF DESCRIPTION OF THE DRAWINGS

In the drawings

Like parts are referred to by the same reference numerals in the drawings.

MODES FOR CARRYING OUT THE INVENTION

The invention process may be used to make any form of magnetic recording medium that comprises a laminated composite of a binderless thin ferromagnetic metal layer and a base film or support layer. It is particularly useful for making magnetic tape for high density video recording and flexible discs.

Figure 1:
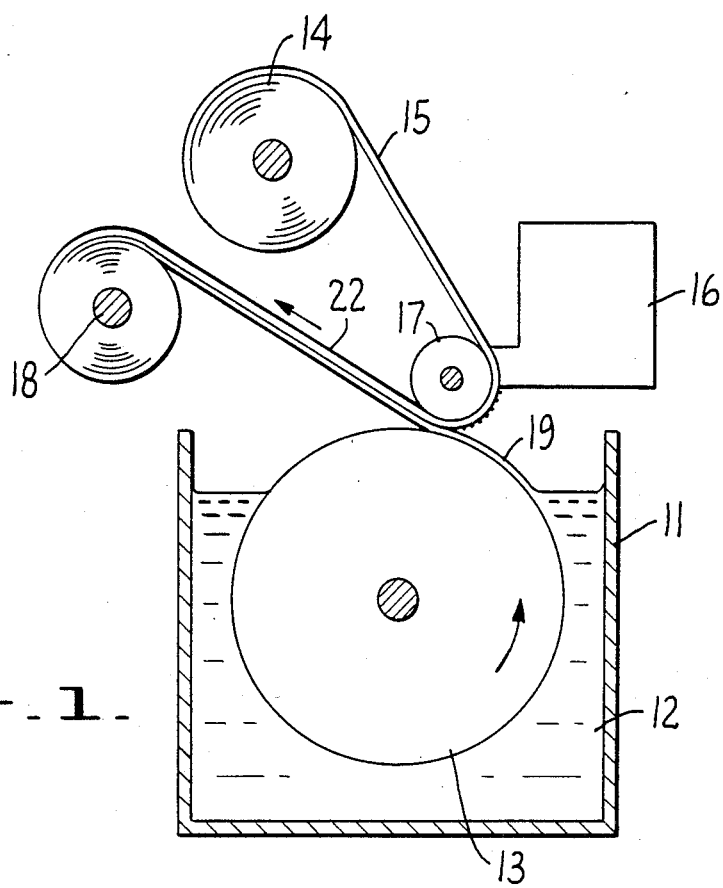
FIG. 1 is a partly schematic, partly cross-sectional illustration of an embodiment of the basic apparatus for making the plated magnetic tape in accordance with the invention in which the continuous passivated surface is provided by a rotating mandrel and the base film layer is applied to the plated surface as a preformed, adhesive-coated web.

FIG. 1 depicts apparatus for making plated magnetic recording tape according to the invention. The basic elements of this apparatus are a plating bath tank 11, plating bath 12 contained within the tank, a cylindrical mandrel 13 rotatably supported partly immersed in the bath, a base film feed roll 14 providing a continuous supply of base film 15, an adhesive applicator means 16 for applying an adhesive material to one side of the base film, a nip roller 17, and a product tape take up roll 18.

The metal film plating technique depicted in FIG. 1 is electroless. Electroless plating is a well known process. In electroless plating a continuous film of the ferromagnetic metal is deposited on the mandrel surface by the interaction in solution of a salt of the metal and a chemical reducing agent. Electroless plating can provide a film of a single metal or an alloy on conductive (metal) or nonconductive (plastic) surfaces. In this regard, as used to describe the ferromagnetic layer of the laminated composite the term "metal" is intended to include films of a single metal or an alloy. The bath used in electroless plating will contain an appropriate metal salt and reducing agent. Plating baths also usually include other additives such as buffers, complexing agents, stabilizers and the like. Electroless baths for depositing ferromagnetic materials are described in the literature. See, for instance U.S. Pat. No. 4,096,374. The metal salt and reducing agent must be replenished as they are consumed in the process.

Electroplating may also be used as a plating technique. In this alternative the bath would be an electroplating bath (electrolyte). In electroplating the metal film is electrodeposited from an electrolyte——typically an aqueous acid or alkaline solution——onto the mandrel surface. The mandrel is electrically connected as the cathode in the bath and the anode is the metal to be deposited and is normally present as a plate suspended in the bath. Plating current is introduced through the anode which is gradually consumed in the process.

Although not shown in the drawings the plating tank will usually include bath recirculating means to provide for filtering the bath and controlling its concentration, pH, and temperature.

The cylindrical surface of the mandrel is the surface on which the thin metal film component of the magnetic tape is formed. Accordingly, the surface contour (roughness) of the metal film component will be a mirror image of the contour of the mandrel surface. Correlatively the surface contour of the metal film will depend upon the surface contour of the mandrel rather than on the surface contour of the base film as in the prior art processes. Accordingly, the term "substantially independent" that is used herein to describe the relationship between the surface contours of the metal plate and base film is intended to mean that the surface contour of neither side of the metal plate (i.e. neither the side forming the common border with the base film nor the opposite side) conforms to the surface contour of the side of the base film to which the plate is adjacent. In this regard it will be appreciated that the surface contour of the mandrel may be controlled and monitored much easier and more rigorously than the surface contour of base film stock. The mandrel surface is, therefore, composed of a material whose surface may be cast, polished or electroformed or otherwise formed or treated to produce a desired contour, typically to a uniform low degree of surface roughness. Preferably, it will have a surface roughness $\leq 0.10$ $\mu$m and a surface roughness period of $\leq v/10^6$ $\mu$m where $v$ is the relative speed between a magnetic recording head and the medium in $\mu$m/sec. The nature of the mandrel surface must also be such that the degree of adhesion (physical or chemical bonding) between it and the metal film plated on it will allow the metal film to be readily stripped from the mandrel surface. The term "passivated" is used herein to denote this latter characteristic. It is also desirable that the surface be durable, i.e., that it maintain these characteristics for a reasonable lifetime. Provided these requirements are met, the mandrel surface may be made from various polymers or metals. For instance, it may be made from electroless nickel that has been passivated such as by treatment with nitric acid to form an ultrathin layer of oxide on its surface.

The thickness of the metal plate formed on the metal surface will depend upon the plating bath and conditions and the duration over which the mandrel surface is contacted by the bath. The thickness will typically be in the range of 0.05 to 10 $\mu$m, preferably 0.1 to 0.5 $\mu$m for contact recording. As shown in FIG. 1, the rotating mandrel emerges from the plating bath with the metal film, designated 19, plated on its surface. Although not shown in FIG. 1, the plated surface of the mandrel may be dried or otherwise treated to facilitate further processing before the base film is applied to the surface. The rotation of the mandrel carries its plated surface into contact with the base film. The mating of the plated surface and the base film is accomplished by passing the base film from the feed roller, past the adhesive applicator where its mating side is coated with adhesive and around nip roller 17. Nip roller 17 is positioned so as to guide the base film into substantially parallel contact with the plated surface of the mandrel. The linear speeds of the plated surface and the base film may be synchronized by driving the mandrel and the nip roller with the same motor (not shown) with appropriate gearing (not shown) to compensate for the difference in the diameters of the mandrel and the nip roller. The thus formed laminated composite, designated 22, is taken up by take up roll 18. The position of the take up roll causes the laminate composite to be stripped off the mandrel. The take up roll will typically be driven and supported in a manner that maintains a constant predetermined tension on the laminated composite being stripped from the mandrel.

Figure 2:
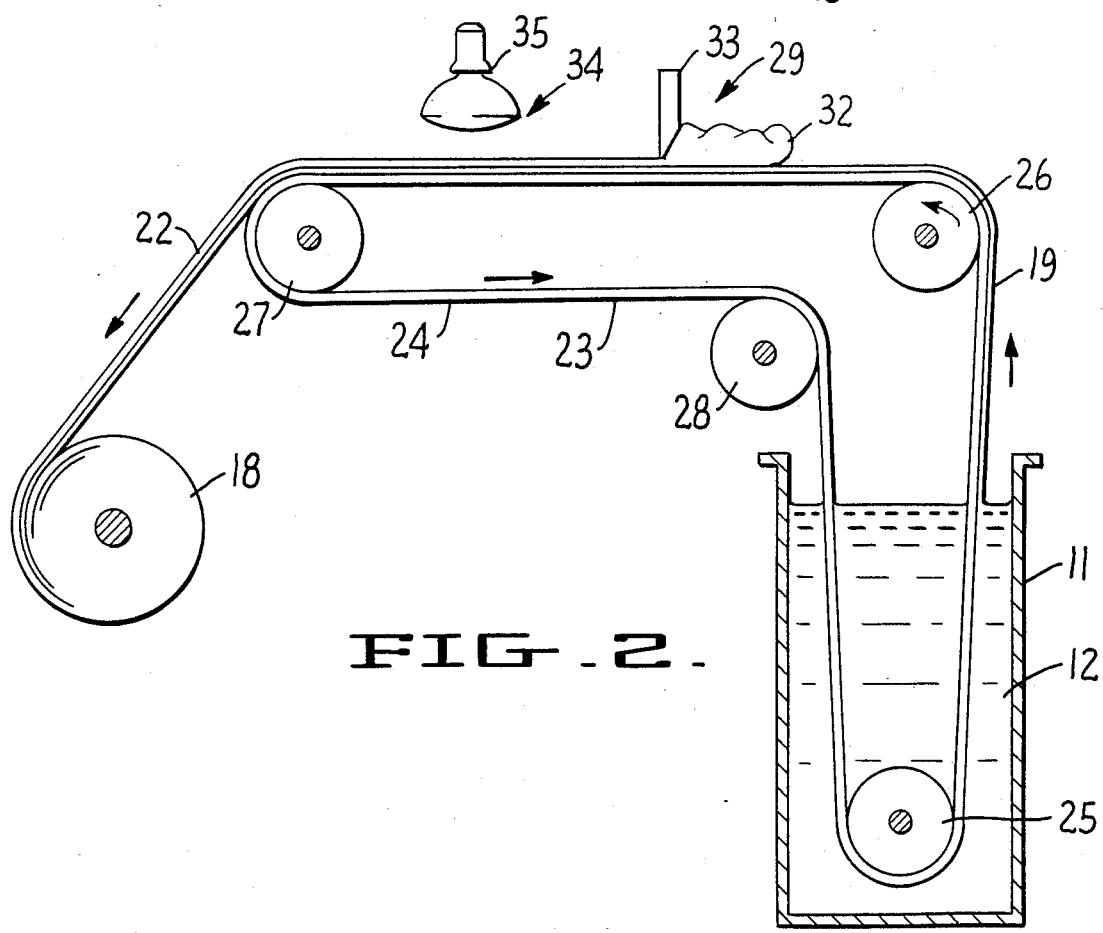
FIG. 2 is a partly schematic, partly cross-sectional illustration of another embodiment of the basic apparatus for making magnetic recording tape according to the invention in which the continuous passivated surface is provided by an endless belt and the base film is applied to the plated surface in the form of a curable resin coating.

FIG. 2 shows an alternative apparatus and process to that shown in FIG. 1. The FIG. 2 apparatus includes a plating bath tank 11 and a plating bath 12 that are identical in function and operation to those of FIG. 1. The continuous surface that is plated in the bath is defined by an endless belt 23. The side 24 of the belt that carries the plating must have the same characteristics as the surface of the mandrel of FIG. 1. The path of the endless belt is defined by guide rollers 25, 26, 27 and 28. Rollers 25 and 26 are driven synchronously at a speed which provides the desired belt residence time in the bath. The plated belt exits the bath and courses about roller 26 to a base film coating station, generally designated 29. At the coating station the base film is applied to the plated side of the belt as a radiation curable resin 32 which is spread on the plated belt surface in a uniform manner by means of a stationary doctor blade 33. Other resin application techniques such as spraying and the like may be used instead of the doctor blade procedure. If desired fibrous or particulate fillers may be added to the resin 32 to enhance its strength. After leaving the coating station the base film coated, thin metal-plated belt passes to a curing station, generally designated 34. At the curing station the resin coating is exposed to radiation of an appropriate wave length for a time sufficient to achieve the desired degree of curing. The radiation is generated with a suitable generator, shown in the drawing as an electric light bulb 35. After the curing step the laminated composite is stripped from the belt and taken up by take up roller 18. The belt returns to the bath to continue the plating operation.

The embodiment shown in FIG. 2 may be readily modified to a process that applies multiple metallic layers and/or additional backing layers by passing the belt through additional plating baths and/or past additional coating stations, as the case may be. For instance secondary strengthening plates or secondary plates that offset the tendency of the composite to curl may be applied in this manner. Also, media plated on both sides may be made by applying a second plate to the non plated side of the two layer composite shown in the drawings. The second plate could be applied by using the two layer composite as a feed to the process. Media such as "floppy discs" may be made from composites plated on both sides.

The invention process provides plated magnetic tape whose plated surface, as formed, has acceptable surface characteristics (roughness). Subsequent surface treatment such as burnishing or polishing may be eliminated if desired. Other conventional processing steps such as slitting, punching, or coating the metal surface to render it corrosion resistant, and the like may be included in or added to the processes depicted in the drawings.

Conventional plating baths and base film materials may be used in the process. Accordingly, the thin metal plate may consist of at least one ferromagnetic metal such as iron, cobalt, and nickel or various alloys thereof. Examples of typical base film materials that may be used are cellulose acetate, nitrocellulose, ethyl cellulose, methyl cellulose, polyamides, polymethyl methacrylate, polytetrafluoroethylene, polytrifluoroethylene, polymers or copolymers of α-olefins such as ethylene and propylene, polymers or copolymers of vinyl chloride, polyvinylidene chloride, polycarbonates, polyimides, polyethylene terephthalate and polybutylene terephthalate.

Modifications of the above described modes for carrying out the invention that are obvious to those of skill in the fields of chemistry, metal plating, magnetic recording materials manufacture and related fields are intended to be within the scope of the following claims.

I claim:

1. Continuous process for making a plated magnetic recording material in the form of a continuous length laminated composite film comprising:
   (a) plating a passivated smooth continuous length surface with a continuous film of ferromagnetic metal having a thickness in the range of 0.05 to 10 microns;
   (b) applying a nonmagnetic base film to the plated continuous surface to form said laminated composite composed of said continuous film of ferromagnetic material secured directly to said nonmagnetic base film; and
   (c) stripping the laminated composite from the continuous surface.

2. The process of claim 1 wherein the continuous surface is defined by a cylindrical mandrel.

3. The process of claim 1 wherein the continuous surface is defined by an endless belt.

4. The process of claim 1 wherein the surface roughness of the continuous surface is $\leq 0.10$ μm.

5. The process of claim 1 wherein the base film is polymeric and is applied to the plated continuous surface as a preformed web.

6. The process of claim 5 wherein the side of the web that is applied to the plated continuous surface is coated with an adhesive material.

7. The process of claim 1 wherein the continuous surface is defined by an endless belt, the base film is applied to the plated continuous surface in the form of a curable resin coating and the laminated composite is subjected to a curing step before the composite is stripped from the continuous surface.

8. A plated magnetic recording medium comprising a continuous length laminated composite film of:
   (a) a nonmagnetic base film layer; and
   (b) a thin plate of a continuous film of ferromagnetic metal having a thickness in the range of 0.05 and 10 microns secured directly to one side of the base film layer, the surface contour of which is substantially independent of the surface contour of the side of the base film to which the plate is secured.

9. A plated magnetic recording material made by the process of claim 1.

10. The process of claim 7 wherein the base film is applied to the plated continuous surface in doctor blade fashion.

11. The process of claim 1 wherein the laminated composite is stripped from the continuous surface by taking the laminated composite up on a take up roll.

12. The process of claim 1 wherein the laminated composite film is useful as a high density video recording tape.

13. The plated magnetic recording medium of claim 8 wherein the medium is useful as high density video recording tape.

* * * * *